United States Patent
Wang et al.

(10) Patent No.: US 9,431,684 B2
(45) Date of Patent: Aug. 30, 2016

(54) MASTER-SLAVE TYPE BATTERY MANAGEMENT SYSTEM FOR ACCURATE CAPACITY GUAGE OF BATTERY PACK

(71) Applicant: HYCON TECHNOLOGY CORP., Taipei (TW)

(72) Inventors: Chuan Sheng Wang, Taipei (TW); Hsiang Min Lin, Taipei (TW); Jui Cheng Lee, Taipei (TW)

(73) Assignee: Hycon Technology Corp., Taipei (TW)

( * ) Notice: Subject to any disclaimer, the term of this patent is extended or adjusted under 35 U.S.C. 154(b) by 405 days.

(21) Appl. No.: 14/170,797

(22) Filed: Feb. 3, 2014

(65) Prior Publication Data

US 2015/0221993 A1    Aug. 6, 2015

(51) Int. Cl.
*H02J 7/00* (2006.01)
*H01M 10/42* (2006.01)
*H01M 10/48* (2006.01)

(52) U.S. Cl.
CPC ......... *H01M 10/425* (2013.01); *H01M 10/482* (2013.01); *H01M 2010/4278* (2013.01); *H01M 2220/20* (2013.01); *H01M 2220/30* (2013.01)

(58) Field of Classification Search
USPC .......................................... 320/116, 132, 106
See application file for complete search history.

(56) References Cited

U.S. PATENT DOCUMENTS

| | | | | |
|---|---|---|---|---|
| 6,078,165 A * | 6/2000 | Ashtiani | ............... | H02J 7/0021 320/116 |
| 6,291,972 B1 * | 9/2001 | Zhang | ................... | H02J 7/0045 320/116 |
| 7,135,836 B2 * | 11/2006 | Kutkut | .................... | H02J 7/022 320/116 |
| 7,463,008 B2 * | 12/2008 | Takahashi | ............. | H02J 7/0022 320/118 |
| 7,834,595 B2 * | 11/2010 | Yasuhito | ............. | H01M 10/441 320/124 |
| 2009/0102424 A1 * | 4/2009 | Tien | ...................... | H02J 7/0022 320/124 |
| 2011/0156640 A1 * | 6/2011 | Moshfeghi | ............. | H02J 7/025 320/108 |

\* cited by examiner

*Primary Examiner* — Samuel Berhanu
(74) *Attorney, Agent, or Firm* — Che-Yang Chen; Law Offices of Scott Warmuth

(57) ABSTRACT

A master-slave type battery management system for accurate capacity gauge of battery packs is disclosed. It includes several battery management units linked to each other via a communication line. Each battery management unit is linked to a specified rechargeable battery set to manage the specified rechargeable battery set, detect a physical measurement data from the specified rechargeable battery set and calculates battery set capacity related value based on the physical measurement data. Each battery management unit has a unique battery ID. By assigning a battery management unit having a specified battery ID as a master battery management unit, the rest battery management units become slave battery management units. Each slave battery management unit sends the physical measurement data and battery set capacity related value to the master battery management unit via the communication line. The master battery management unit is in charge of calculating related values and transmitting them.

11 Claims, 5 Drawing Sheets

MASTER-SLAVE TYPE BATTERY MANAGEMENT SYSTEM FOR ACCURATE CAPACITY GUAGE OF BATTERY PACK

FIELD OF THE INVENTION

The present invention relates to a battery management system. More particularly, the present invention relates to a master-slave type battery management system. The system can accurately measure capacity of a battery composed of several rechargeable battery sets.

BACKGROUND OF THE INVENTION

Laptop computers, tablets, mobile phones, and even large electric vehicles and robots, all have a rechargeable battery composed of several rechargeable battery sets linked in series or parallel with a certain working capacity. The rechargeable battery set is also composed of a number of rechargeable battery cells connected in series or parallel. As far as the battery set assembly factory is concerned, the rechargeable battery cells purchased may come from different vendors (even made by themselves). Specification (discharging capacity or discharging voltage) of the rechargeable battery cells might not differ. However, due to materials used, differences in detailed design, precision of processing or even different batches of manufacturing, performance, such as discharging capacity, of the rechargeable battery cells might fluctuate. Use of mixed lots of rechargeable battery cells in a rechargeable battery often causes battery unbalance after the rechargeable battery is assembled. It is inevitable in practice to use mixed rechargeable battery cells having different performance. Another example is an electrical vehicle powered by huge amount of battery sets. Since the number of rechargeable battery cells is more, maintenance of the battery sets is often carried out by replacing rechargeable battery cells with new ones so as to extend lifetime. If the replaced rechargeable battery cell is requested to have the same characteristics as other existing rechargeable battery cells, it is difficult. Management and measurement of the rechargeable battery under aforementioned problems are not easy.

Master-slave control is a method to take one device as a main device which is able to control or manage other linked devices. With the application of the method on battery management, it is able to achieve the effects of classified battery monitor and unified data processing. It is a good way to manage and measure the rechargeable battery cells by distinguishing them into a master and slaves according to some characteristics. Related technique has been disclosed by the U.S. Pat. No. 7,453,236. Please refer to FIG. 1 and FIG. 2. FIG. 1 illustrates a multi-battery set system of the technique. The system includes a master battery set 100 and a first to a Nth slave battery sets 101~10N. The master battery set 100 and the first to Nth slave battery sets 101~10N are linked in series to the power outputs V+ and V− and output a predetermined power to the power outputs V+ and V−. The master battery set 100 and the first to Nth slave battery sets 101~10N have the same configuration. It is only in the difference of roles of master and slave. Therefore, only one battery set is illustrated.

Please refer to FIG. 2. When a battery set is set as a master battery set, a controller 200 of the battery set receives a total voltage value from the first to Nth slave battery sets 101~10N and a battery voltage and current detecting circuit 202 receives a total voltage value from a battery string 204 (with 8 battery cells linked in series inside). Then, the controller 200 calculates a target total voltage value of the whole the battery set and pass it to the first to Nth slave battery sets 101~10N to control a switch unit 206 according to the target total voltage value. Meanwhile, when others are set as slave battery sets, the controller 200 sends a total voltage value of itself according to the request from the master battery set 100 and control the switch unit 206 according to the target total voltage value provided by the master battery set 100. A switch unit controller 208 inside the switch unit 206 controls on/off of a charging switch element 2081 and a discharging switch element 2082 according to the target total voltage value in different charging and discharging stages, respectively. The system uses a driving signal to operate the controller 200. The controller 200 and other battery set are connected in a communicating path which conforms to the specification of RS232.

The most special feature of the '236 is the way it chooses the master battery set. The way is to let each battery set to judge if the voltage signal in the communication line is at high level or low level during a first desired time when they are just initiated or receive a setting master battery signal. If the signal is at the low level, it means other battery sets want to be the master battery set. Then, each battery set sets itself as a slave battery automatically when it receives another setting master battery signal indicating which one is the master battery set. Otherwise, if the signal is at the high level, it means other battery sets don't want to be the master battery set. Then, any one of the battery sets sends a low level voltage signal during a second desired time and a high level voltage signal after the second desired time lapses. If one battery set finds out that all the signals received from the communication line is at the high level after it sent out the high level voltage signal, it means all other battery sets don't want to be the master battery after querying, then the battery set sets itself as the master battery set automatically and sends the mentioned setting master battery signal indicating which one is the master battery set to other battery sets. It is conceivable that if all battery sets send the high level voltage signal after the second desired time lapses, is it possible to confirm which one is master battery set? In order to settle such special condition, '236 has set different second desired time for each battery set. It means the choice of master battery set has priority differences without considering the environmental variability and signal transmission problems in the case.

The patent mentioned above has provided a good example of master-slave control technique. With application of master and slave battery sets, a single window is provided for administration so that calculation of total voltage can be done by the master battery set for all the battery sets and then fed back to each slave battery set. It is advantageous that it is easy to control charge or discharge of each battery set when the whole battery set system charges or discharges in case the problems such as over-charge and over-discharge.

However, according to the battery set system in the patent, the role of the master battery set is not assigned by turns for every battery set. It is easy to excessively rely on some battery set and cause burden for that battery set so as to consume related managing element and reduce its lifetime. Meanwhile, as to the priority of master battery set has been defaulted. If the managing element has problem to work, operation of the whole system will be affected. Last, the system can only detect voltage value. Other data related to power capacity can not be available through the system. About the defects mentioned above, it is desired for the related industry to find out so that a better battery set system and battery management system can be provided.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

The known battery set system with master-slave control can not utilize its managing elements well so that burden is caused to the managing elements to affect lifetime and performance. Meanwhile, there is not rule for priority of use of managing elements. It is easy to keep problem managing element to work as a control role. Operation of the system may be cumbered. Last, application of measured data of the battery set is only limited to voltage value and too narrow.

Therefore, it is needed to develop a battery management system with master-slave control. The battery management system can utilize all its battery managing elements properly and change the master battery managing element timely to settle the problem of overuse. Meanwhile, the battery managing elements can not have defaulted priority. Last, the battery management system should be able to measure more physical datum about battery capacity and, preferably, application value derived or calculated from the physical datum.

Hence, a master-slave type battery management system for accurate capacity gauge of battery packs composed of a number of battery sets is disclosed. The battery management system includes a number of battery management units linked to each other via a communication line. Each battery management unit links to a specified rechargeable battery set for managing the specified rechargeable battery set, detecting a physical measurement data from the specified rechargeable battery set and calculating battery set capacity related value based on the physical measurement data. The battery management system is characterized in that: each battery management unit is provided with a unique battery ID, by assigning a battery management unit having a specified battery ID as a master battery management unit, the rest battery management units become slave battery management units with battery IDs respectively, each slave battery management unit sends the detected physical measurement data and calculated battery set capacity related value to the master battery management unit via the communication line, the master battery management unit detects a physical measurement data from the corresponding rechargeable battery set, calculates a battery set capacity related value, accumulates physical measurement datum from every battery management unit as a battery detected physical data, calculates battery set capacity related values from every battery management unit as a battery capacity related value and sends the battery detected physical data and battery capacity related value to a host connected with the battery management system.

Preferably, the host can communicate with the battery management unit having a specified battery ID by identifying battery ID to manage the rechargeable battery set linked with the battery management unit.

Preferably, the host can communicate with the battery management unit having a specified battery ID by identifying battery ID to fetch the physical measurement data or calculated battery set capacity related value of the rechargeable battery set linked with the battery management unit.

Preferably, the master battery management unit is assigned by the host.

Preferably, the assigned master battery management unit can make a decision to assign a slave battery management unit as a new master battery management unit, set itself as a slave battery management unit, and inform the host about the decision.

Preferably, the physical measurement data is voltage value, current value or coulomb counting value.

Preferably, the battery set capacity related value is full charge capacity, remaining capacity, time-to-empty estimate or time-to-full estimate.

Preferably, the battery detected physical data is a cumulative value of physical measurement datum from every battery management unit.

Preferably, the battery capacity related value is a cumulative value of every battery set capacity related values or the maximum value of all battery set capacity related values.

Preferably, the battery management unit further comprises: a measuring element, linked to the corresponding rechargeable battery set, for measuring a physical measurement data of the rechargeable battery set; a managing element, electrically connected to the measuring element, for accumulating received physical measurement data, calculating received battery set capacity related value, sending the physical measurement data, battery detected physical data and battery set capacity related value, and battery capacity related value and controlling the rechargeable battery set when a commend from the host is received, and when the battery management unit is assigned to be a master battery management unit, according to a restriction, making a decision to assign a slave battery management unit as a new master battery management unit, setting the battery management unit as a slave battery management unit and inform the host about the decision; a memory element, electrically connected to the managing element, for memorizing and providing the battery ID; and a communication element, electrically connected to the managing element and linked to the communication line, for transceiving the physical measurement data, battery set capacity related value, battery detected physical data and battery capacity related value and communicating with the host.

Preferably, the restriction is number of use or time of the battery detected physical data or battery set capacity related value.

The battery management system according to the present invention can properly change the master battery management unit to avoid decrease of lifetime of the battery set. Choice of master/slave battery management units doesn't have a default sequence. Each battery management system should be able to measure more physical measurement datum about battery capacity, accumulate physical measurement datum from the battery management units as a battery detected physical data, calculate battery set capacity related values from the battery management units as a battery capacity related value and send the battery detected physical data and battery capacity related value to a host linked to the battery management system to facilitate data collection for battery management.

DETAILED DESCRIPTION OF THE PREFERRED EMBODIMENT

The present invention will now be described more specifically with reference to the following embodiment.

Figure 1:
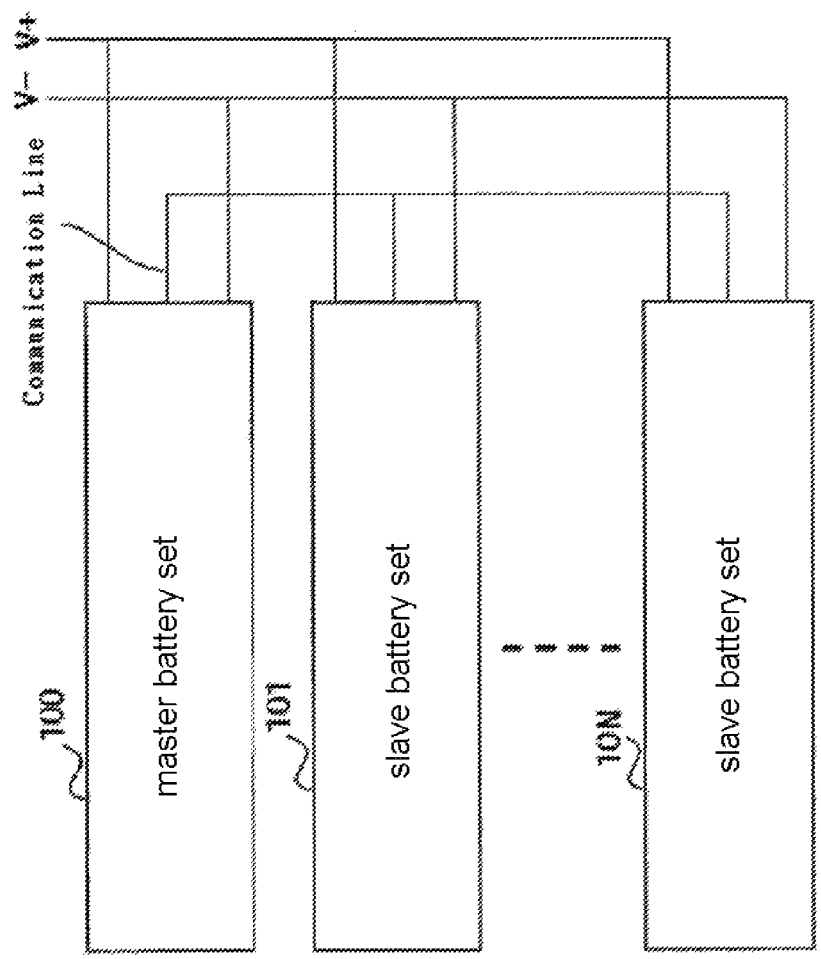
FIG. 1 is a block diagram of a prior art of a multi-battery set system with master-slave control.
Figure 2:
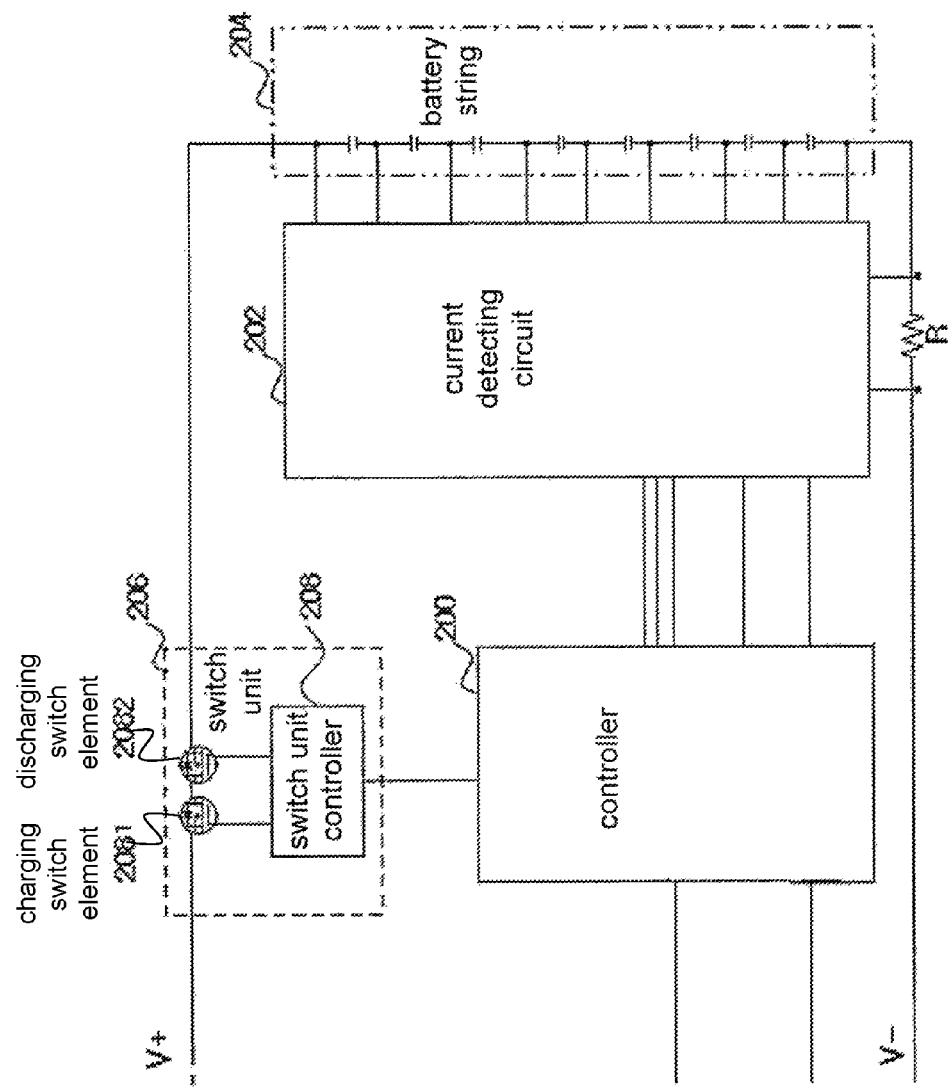
FIG. 2 is a block diagram of internal design of the battery set.
Figure 3:
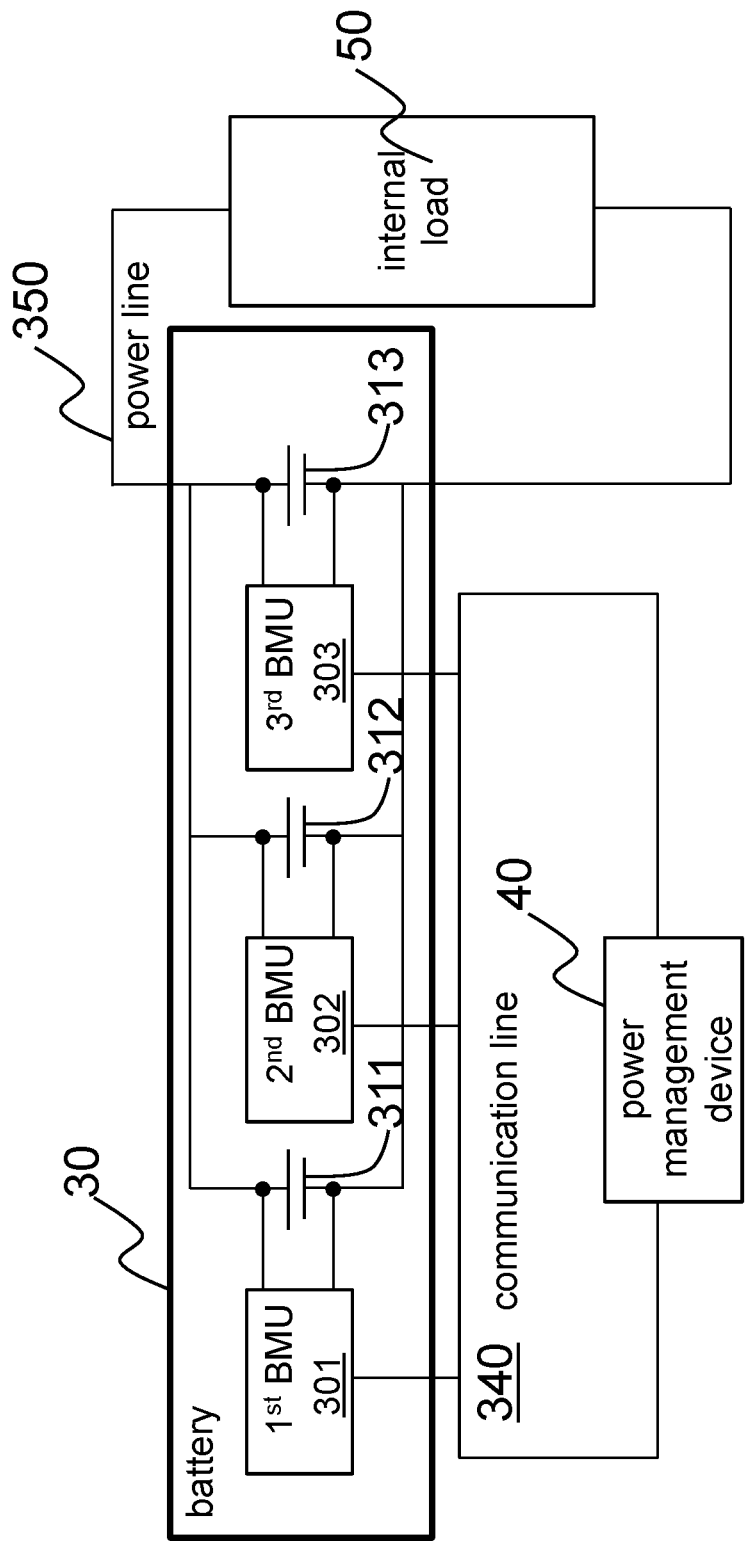
FIG. 3 is a block diagram of a battery management system according to an embodiment of the present invention.
Figure 4:
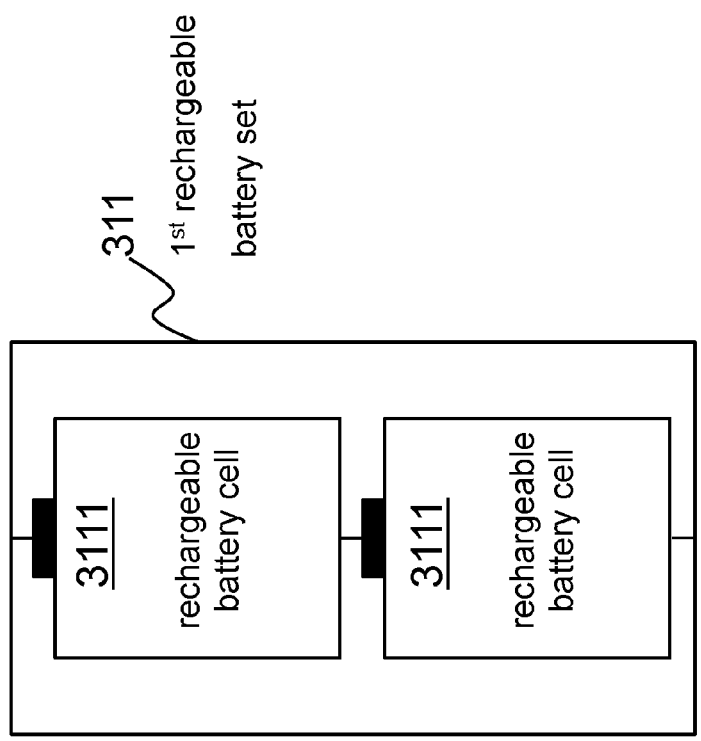
FIG. 4 is a block diagram showing connection of rechargeable battery cells in a rechargeable battery set.
Figure 5:
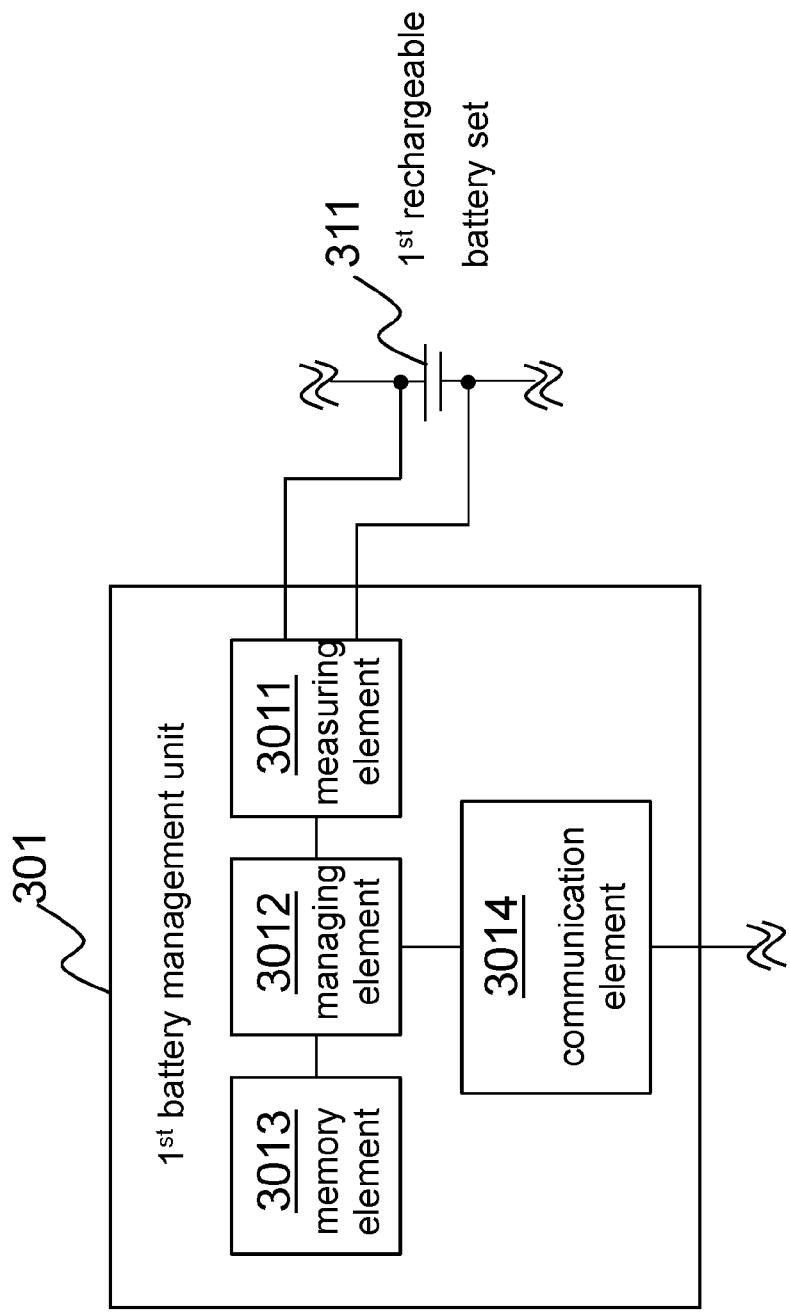
FIG. 5 is a block diagram of internal design of a battery management unit.

Please refer to FIG. 3 to FIG. 5. FIG. 3 shows a battery management system according to an embodiment of the present invention and a power management device using the battery management system in a laptop computer. FIG. 4 illustrates connection of rechargeable battery cells in a rechargeable battery set. FIG. 5 shows internal design of a battery management unit.

A battery 30 includes a first rechargeable battery set 311, a second rechargeable battery set 312 and a third rechargeable battery set 313, and a first battery management unit 301, a second battery management unit 302 and a third battery management unit 303 linked to the first rechargeable battery set 311, the second rechargeable battery set 312 and the third rechargeable battery set 313 in parallel, respectively. The first rechargeable battery set 311, second rechargeable battery set 312 and third rechargeable battery set 313 linked to each other in parallel via a power line 350 to provide DC power to an internal load 50 in the laptop computer to operate the laptop computer. The first battery management unit 301, second battery management unit 302 and third battery management unit 303 linked to each other via a communication line 340. The communication line 340 also links to a power management device 40 in the laptop computer for transmitting battery management data. Each rechargeable battery set 311, 312 or 313 is composed of rechargeable battery cells with the same specification. Connection of rechargeable battery cells inside each rechargeable battery set 311, 312 or 313 is identical. Take the first rechargeable battery set 311 as an example. Please see FIG. 4. It shows that the first rechargeable battery set 311 is composed of 2 rechargeable battery cells 3111 connected in series internally.

The aforementioned communication line 340 conforms to the specification of Inter-Integrated Circuit (I2C). In practice, it is not limited so. The communication line 340 conforms to the specification of System Management Bus (SMBus), Serial Peripheral Interface (SPI) Bus or RS232 of Electronic Industries Alliance (EIA) can also be applied in the present invention. It should be noticed that although FIG. 3 shows the communication line 340 by one single line, however, in fact, the communication line 340 can includes two lines (I2C uses serial data line and serial clock) or more. It is understood that the management device 40 is the host. Due to consolidation of functions of the host, there are integrated CPUs which have functions of power management. Hence, for any device having functions of power management, especially functions of battery power management, it can be used as the power management device in the present invention.

The way that the present invention operates must have assigned a master battery management unit and slave battery management units to carry out battery management. The assigning method is as follow. Each battery management unit is provided unique battery ID. By assigning a battery management unit having specified battery ID as the master battery management unit, the rest battery management units become slave battery management units with specific battery ID, respectively. Here, the battery ID of the first battery management unit 301 is HYC001. The battery ID of the second battery management unit 302 is HYC002. The battery ID of the third battery management unit 303 is HYC003. After it is set up, the first battery management unit 301 having battery ID of HYC001 is the master battery management unit. The second battery management unit 302 and third battery management unit 303 are slave battery management units. It should be noticed that the present invention is characterized in that the assigned master battery management unit can make a decision to let some slave battery management unit be a new master battery management unit due to some factors, such as over-use, and sets itself as a slave battery management unit. For example, each battery management unit defaults a number of operation data transmittance to be one million times when it is assigned as the master battery management unit. After one million times of operation data transmittance, the first battery management unit 301 chooses the second battery management unit 302 as a new master battery management unit while it becomes a slave battery management unit to reduce overload and extend lifetime.

According to the present invention, the first battery management unit 301, the second battery management unit 302 and third battery management unit 303 are identical but just different in assigned job functions. When the battery management system operates, the second battery management unit 302 and third battery management unit 303 (slave battery management units) send a detected physical measurement data and a calculated battery set capacity related value from the second rechargeable battery set 312 and third rechargeable battery set 313 to the first battery management unit 301 (master battery management unit), respectively, via the communication line 340. The first battery management unit 301 accumulates physical measurement datum from every battery management unit (including the master and slave battery management units) as a battery detected physical data, calculates battery set capacity related values from every battery management units as a battery capacity related value and send the battery detected physical data and battery capacity related value to a host connected with the battery management system.

The power management device 40 can further communicate with a battery management unit having a specified battery ID by identifying battery ID to manage the rechargeable battery set connected with the battery management unit. For example, the power management device 40 can identify that rechargeable battery set connected from the battery management unit with a battery ID of HYC002 is not balanced via the communication line 340. It would like to order the second rechargeable battery set 312 for balancing the rechargeable battery cells. As long as the commend is sent, with the operation of the battery management system, the mentioned object can be achieved.

Furthermore, the power management device 40 can communicate with a battery management unit having a specified battery ID by identifying battery ID to fetch the physical measurement data and/or calculated battery set capacity related value of a rechargeable battery set connected with the battery management unit. For example, if the power management device 40 wants to know the discharge voltage value and remaining capacity of the third rechargeable battery set 313 at this moment, it is only to identify a corresponding battery ID is HYC003. A request is sent to order the third battery management unit 303 having the battery ID of HYC003 to report the newest discharge voltage value and calculated remaining capacity of the third rechargeable battery set 313.

The physical measurement data mentioned above refers to a physical data measured by electrical elements. For example, voltage value, current value or coulomb counting value. It is not limited to the three items according to the present invention. Other physical quantity, such as temperature, can be the physical measurement data. For the present invention, the physical measurement data includes voltage value, current value or coulomb counting value. Measurement of a single physical measurement data or two also in the scope of the present invention. The battery set capacity related value is the calculated value related to measurement of power capacity according to different detected physical measurement data and following a specified calculation. According to the present invention, the battery set capacity related value includes full charge capacity, remaining capacity, time-to-empty estimate, time-to-full estimate, average voltage value or average current. According to the request of the power management device 40, it is able to send the battery set capacity related values individually, partially or even all.

After all physical measurement datum and battery set capacity related values from the second battery management unit 302 and third battery management unit 303 are sent to the first battery management unit 301 via the communication line 340, the first battery management unit 301 proceeds to calculate related values of the battery 30 with the physical measurement data and battery set capacity related value from itself. According to the present invention, a battery detected physical data and a battery capacity related value can be obtained. In this embodiment, current of the battery 30 is the sum of currents from all battery management units. If the current of the first rechargeable battery set 311 is 700 mA, the current of the second rechargeable battery set 312 is 710 mA and the current of the third rechargeable battery set 313 is 705 mA at a time, the total current of the battery 30 is 2115 mA. Similarly, the total coulomb counting value of the battery 30 is also calculated by accumulating all coulomb counting values from the battery management units. In other embodiment, total voltage value can be obtained from a set of series connected rechargeable battery sets.

As to battery capacity related value, the calculating method is not only accumulating all values sent from the battery management units. In the particular example in the embodiment, if all battery management units transmit the calculated full charge capacities of the corresponding rechargeable battery sets, the first battery management unit 301 (master battery management unit) will aggregate all full charge capacities to get a total full charge capacity of the battery 30. If all battery management units send the calculated remaining capacities of the corresponding rechargeable battery sets, the first battery management unit 301 will summarize all the remaining capacities to get a total remaining capacity of the battery 30. If all battery management units transmit calculated time-to-full estimates of the corresponding rechargeable battery sets, the first battery management unit 301 will take the maximum among all time-to-full estimates as a time-to-full estimate of the battery 30. If all battery management units send calculated time-to-empty estimates of the corresponding rechargeable battery sets, the first battery management unit 301 will choose the maximum among all time-to-empty estimates as a time-to-empty estimate of the battery 30. Furthermore, the first battery management unit 301 can further calculate a relative recharge-able status of the battery 30. It is obtained by dividing the total remaining capacity of the battery 30 by the total full charge capacity of the battery 30. It is presented by a percentage. The result is also output as a battery capacity related value.

The battery management system provided by the present invention is assembled by several battery management units with a communication line for linkage. The number of the battery management unit is not limited to 3 as it is in the embodiment. It can be more or less according to actual requirement. Every battery management unit is the same that it can be in a form of an independent integrated circuit or an integrated circuit comprises several battery management units. The present embodiment uses three independent integrated circuits. Each of them includes the first battery management unit 301, the second battery management unit 302 and the third battery management unit 303, respectively. In order to understand how the battery management unit is assembled and operates, please refer to FIG. 5. The first battery management unit 301 is illustrated as an example.

In FIG. 5, the first battery management unit 301 includes a measuring element 3011, a managing element 3012, a memory element 3013 and a communication element 3014. The measuring element 3011 is linked to the first rechargeable battery set 311 to measure a physical measurement data in the rechargeable battery set 311. A managing element 3012 is electrically connected to the measuring element 3011 for accumulating received physical measurement data, calculating received battery set capacity related value, sending the physical measurement data, battery detected physical data and battery set capacity related value, and battery capacity related value and controlling the rechargeable battery set 311 when a commend from the power management device 40 is received Meanwhile, when the first battery management unit 301 is assigned as the master battery management unit, according to a restriction, the managing element 3012 can make a decision to let a slave battery management unit (the second battery management unit 302 or the third battery management unit 303) become a new master battery management unit and set itself as a slave battery management unit. The decision will be passed to the power management device 40. As described above, each battery management unit defaults a number of operation data transmittance to be one million times. After one million times of operation data transmittance, the master battery management unit (the first battery management unit 301) chooses another slave battery management unit as the master battery management unit and becomes a slave battery management unit. Thus, it can reduce burdens of the first battery management unit 301 can extend its lifetime. Here, one million times of operation data transmittance is the restriction. Similarly, from the point of time, if a continuous use of 24 hours is set as a threshold, the master battery management unit may be changed once it works continuously over 24 hours.

The memory element 3013 is electrically connected to the managing element 3012 to memorize and provide the battery ID. The communication element 3014 is electrically connected to managing element 3013 and linked to the communication line 340. It is used to transceive the physical measurement data, battery set capacity related value, battery detected physical data and battery capacity related value the power management device 40. Besides, the communication element 3014 can communicate with the power management device 40 so as to receive commends and proceed battery management.

It should be noticed that the present invention is not limited to the small battery management system, such as laptop computer batteries. A battery needs many rechargeable battery sets assembled for power is suitable for using the battery management system of the present invention. For example, batteries of electrical vehicles are applicable. Meanwhile, another advantage of the present invention is that when a battery having the battery management system provided by the present invention need to repair by replacing rechargeable battery cells with new ones, it is only to use rechargeable battery cells with the same sources or having the same characteristics to be installed in one rechargeable battery set. It is not necessary to consider if the rechargeable battery cells in the rechargeable battery set have the same characteristics like that in other rechargeable battery sets. It is to say that differences can be allowed for rechargeable battery cells in different rechargeable battery sets. The differences include power capacity, impedance and composites.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A master-slave type battery management system for accurate capacity gauge of battery packs composed of a plurality of battery sets, including a plurality of battery management units linked to each other via a communication line with each battery management unit linked to a specified rechargeable battery set for managing the specified rechargeable battery set, detecting a physical measurement data from the specified rechargeable battery set and calculating battery set capacity related value based on the physical measurement data, characterized in that: each battery management unit is provided with unique battery ID, by assigning a battery management unit having a specified battery ID as a master battery management unit, the rest battery management units become slave battery management units, each slave battery management unit sends the detected physical measurement data and calculated battery set capacity related value to the master battery management unit via the communication line, the master battery management unit detects a physical measurement data from the corresponding rechargeable battery set, calculates a battery set capacity related value, accumulates physical measurement datum from every battery management unit as a battery detected physical data, calculates battery set capacity related values from every battery management unit as a battery capacity related value and sends the battery detected physical data and battery capacity related value to a host connected with the battery management system.

2. The battery management system according to claim 1, wherein the host can communicate with the battery management unit having a specified battery ID by identifying battery ID to manage the rechargeable battery set linked with the battery management unit.

3. The battery management system according to claim 1, wherein the host can communicate with the battery management unit having a specified battery ID by identifying battery ID to fetch the physical measurement data or calculated battery set capacity related value of the rechargeable battery set linked with the battery management unit.

4. The battery management system according to claim 1, wherein the master battery management unit is assigned by the host.

5. The battery management system according to claim 1, wherein the assigned master battery management unit can make a decision to assign a slave battery management unit as a new master battery management unit, set itself as a slave battery management unit, and inform the host about the decision.

6. The battery management system according to claim 1, wherein the physical measurement data is voltage value, current value or coulomb counting value.

7. The battery management system according to claim 1, wherein the battery set capacity related value is full charge capacity, remaining capacity, time-to-empty estimate or time-to-full estimate.

8. The battery management system according to claim 1, wherein the battery detected physical data is a cumulative value of physical measurement datum from every battery management unit.

9. The battery management system according to claim 1, wherein the battery capacity related value is a cumulative value of every battery set capacity related values or the maximum value of all battery set capacity related values.

10. The battery management system according to claim 1, wherein the battery management unit further comprises:
   a measuring element, linked to the corresponding rechargeable battery set, for measuring a physical measurement data of the rechargeable battery set;
   a managing element, electrically connected to the measuring element, for accumulating received physical measurement data, calculating received battery set capacity related value, sending the physical measurement data, battery detected physical data and battery set capacity related value, and battery capacity related value and controlling the rechargeable battery set when a commend from the host is received, and when the battery management unit is assigned to be a master battery management unit, according to a restriction, making a decision to assign a slave battery management unit as a new master battery management unit, setting the battery management unit as a slave battery management unit and inform the host about the decision;
   a memory element, electrically connected to the managing element, for memorizing and providing the battery ID; and
   a communication element, electrically connected to the managing element and linked to the communication line, for transceiving the physical measurement data, battery set capacity related value, battery detected physical data and battery capacity related value and communicating with the host.

11. The battery management system according to claim 10, wherein the restriction is number of use or time of the battery detected physical data or battery set capacity related value.

* * * * *